(12) United States Patent
Choi et al.

(10) Patent No.: US 7,649,581 B2
(45) Date of Patent: Jan. 19, 2010

(54) ARRAY SUBSTRATE OF AN LCD COMPRISING FIRST AND SECOND GATE INSULATING LAYERS AND METHOD OF FABRICATING THE SAME

(75) Inventors: Young Seok Choi, Gumi-si (KR); Byung Yong Ahn, Daegu-si (KR); Hong Woo Yu, Gumi-si (KR); Ki Sul Cho, Gumi-si (KR)

(73) Assignee: LG Display Co., Ltd., Seoul (KR)

( * ) Notice: Subject to any disclaimer, the term of this patent is extended or adjusted under 35 U.S.C. 154(b) by 349 days.

(21) Appl. No.: 11/156,476

(22) Filed: Jun. 21, 2005

(65) Prior Publication Data

US 2006/0023138 A1 Feb. 2, 2006

(30) Foreign Application Priority Data

Jul. 30, 2004 (KR) .................. 10-2004-0060542

(51) Int. Cl.
*G02F 1/136* (2006.01)
(52) U.S. Cl. .................. 349/43; 349/42; 349/46
(58) Field of Classification Search .................. 349/46, 349/147, 42, 43, 138
See application file for complete search history.

(56) References Cited

U.S. PATENT DOCUMENTS

| | | | |
|---|---|---|---|
| 5,712,494 A | 1/1998 | Akiyama et al. | |
| 5,888,855 A | 3/1999 | Nagahisa et al. | |
| 5,995,177 A | 11/1999 | Fujikawa et al. | |
| 6,524,876 B1 * | 2/2003 | Baek et al. | 438/48 |
| 6,600,524 B1 * | 7/2003 | Ando et al. | 349/43 |
| 6,912,035 B2 * | 6/2005 | Kaneko et al. | 349/147 |
| 7,112,512 B2 * | 9/2006 | Lan et al. | 438/430 |
| 7,304,383 B2 * | 12/2007 | Cho et al. | 257/751 |
| 7,315,344 B2 * | 1/2008 | Lim | 349/187 |
| 2001/0040648 A1 | 11/2001 | Ono et al. | |
| 2002/0085157 A1 * | 7/2002 | Tanaka et al. | 349/147 |
| 2003/0160236 A1 | 8/2003 | Yamazaki et al. | |
| 2003/0197182 A1 * | 10/2003 | Kim et al. | 257/72 |
| 2004/0263706 A1 * | 12/2004 | Cho et al. | 349/43 |
| 2004/0263746 A1 * | 12/2004 | Cho et al. | 349/139 |

FOREIGN PATENT DOCUMENTS

| | | | |
|---|---|---|---|
| EP | 0 493 113 A3 | 12/1991 | |
| EP | 0493 113 A2 | 7/1992 | |

(Continued)

*Primary Examiner*—Michael H. Caley
*Assistant Examiner*—Charles Chang
(74) *Attorney, Agent, or Firm*—McKenna Long & Aldridge LLP

(57) ABSTRACT

Disclosed is an array substrate of an LCD, and a method for fabricating it, which simplifies the fabrication process, thereby reducing fabrication costs. The process is simplified because the array substrate does not have a passivation film. The thin film transistors on the array substrate each have an active layer that is protected from contamination by forming a channel insulation layer on the active layer through a dry-etching process. Further, the gate line, gate pad, and gate electrode may have a two-layer structure having a low-resistance metal layer and a barrier metal layer, or a three-layer structure having a low-resistance metal layer and two barrier metal layers.

22 Claims, 12 Drawing Sheets

FOREIGN PATENT DOCUMENTS

| | | |
|---|---|---|
| GB | 2421834 A | 5/1920 |
| GB | 2 396 244 A | 6/2004 |
| GB | 2 415 542 A | 12/2005 |
| JP | 02-215134 | 8/1990 |
| JP | 2000-111958 | 4/2000 |
| JP | 2002-289857 | 10/2002 |
| JP | 2004-163933 | 6/2004 |
| JP | 2004-212964 | 7/2004 |

* cited by examiner

ARRAY SUBSTRATE OF AN LCD COMPRISING FIRST AND SECOND GATE INSULATING LAYERS AND METHOD OF FABRICATING THE SAME

This application claims the benefit of Korean Patent Application No. 2004-60542, filed on Jul. 30, 2004 in Korea, which is hereby incorporated by reference for all purposes as if fully set forth herein.

BACKGROUND OF THE INVENTION

1. Field of the Invention

The present invention relates to a liquid crystal display (LCD), and more particularly, to an array substrate for an LCD and fabrication method thereof that has fewer masking processes.

2. Description of the Related Art

As modern society rapidly changes toward an information-oriented society, demand has increased for a flat panel display having superior characteristics advantages such as a slim profile, reduced weight, and low power consumption and high quality color reproduction. Liquid crystal displays (LCDs), one of such flat panel displays, have been developed to meet these needs.

Generally, an LCD includes two substrates, each having an electrode formed on an inner surface. The two substrates are disposed to face each other, and a liquid crystal material is injected into a space between the two substrates. The LCD displays an image by applying a voltage to the electrode such that an electric field is generated within the liquid crystal material. The electric field manipulates the orientation of the liquid crystal molecules, which subsequently changes the transmission of light through the LCD.

The LCD can be fabricated in a variety of types. One of these is an active matrix LCD (AM-LCD) configuration in which thin film transistors (TFTs) and pixel electrodes connected to the TFTs are arranged in a matrix configuration, defining a plurality of liquid crystal cells. AM-LCDs are gaining in prominence due to superior resolution and reproduction capability of moving images.

In an AM-LCD, a lower array substrate has pixel electrodes formed on its surface, and an upper color substrate has a common electrode formed on its surface. As a voltage is applied to the electrodes of the array substrate and the color substrate, a vertical electric field is formed between the two substrates to manipulate the liquid crystal molecules. The AM-LCD has advantages such as superior transmittance and aperture ratio, and also prevents electrostatically-induced failure in the liquid crystal cells by having the upper common electrode serve as a ground.

The upper color substrate further includes a black matrix for preventing light leakage phenomenon at a portion other than the pixel electrodes.

The lower array substrate is formed by iterative processes of depositing thin films and patterning the deposited thin films by a photolithography using a mask. In the patterning of the deposited thin films, five or six masks are generally used. The number of masks used generally corresponds to the number of processes used for fabricating the array substrate.

A related art array substrate for an LCD and fabrication method thereof will now be described with reference to FIGS. 1 and 2. FIG. 1 is a plan view of an array substrate for an LCD according to the related art, and FIG. 2 is a sectional view taken along the line I-I' of FIG. 1.

Referring to FIGS. 1 and 2, the array substrate for an LCD includes a transparent insulating substrate 110, a plurality of gate lines 121 formed on the transparent insulating substrate 110 in a horizontal direction, and a plurality of gate electrodes 122 extending from the plurality of gate lines 121. A gate insulator 130 is formed on the gate lines 121 and the gate electrodes 122, and an active layer 141 and an ohmic contact layer 151, 152 are sequentially formed on the gate insulator 130.

Further formed on the array substrate are a plurality of data lines 161 perpendicularly crossing the plurality of gate lines 121; a source electrode 162 extending from each of the date lines 161; a drain electrode 163 facing the source electrode 162 centering on the gate electrode 122; and a capacitor electrode 165 overlapping each of the plurality of gate lines 121.

The data lines 161, the source and drain electrodes 162 and 163, and the capacitor electrode 165 are covered with a passivation layer 170. The passivation layer 170 has first and second contact holes 171 and 172 exposing the drain electrode 163 and the capacitor electrode 165, respectively.

A pixel electrode 181 is formed at a pixel region on the passivation layer 170, the pixel region being defined by the crossed gate lines 121 and data lines 161. The pixel electrode 181 is electrically connected to the drain electrode 162 and the capacitor electrode 165 through the first and second contact holes 171 and 172, respectively.

The array substrate having the above construction can be fabricated by a photolithography process using five masks. Each photolithography process includes steps of rinsing the substrate, coating a photoresist film, developing and patterning the exposed photoresist film and etching a layer exposed by the photoresist pattern.

Accordingly, if a single photolithography process can be omitted, the overall fabrication time is reduced to a considerable degree and the total fabrication cost can be decreased. Also, since each photolithography process bears a certain risk of failure, eliminating a photolithography step may reduce the rate of substrate failures. Therefore, it is preferable that the number of the masks used be decreased during the fabrication of the array substrate.

In addition, since the array substrate has the passivation layer on an entire surface thereof including the TFTs, a costly plasma enhanced chemical vapor deposition (PECVD) equipment is generally required, which results in an increase in the fabrication cost.

Further, since the passivation layer has contact holes so as to connect the drain electrode and the capacitor electrode with the pixel electrode, a photolithography process for the formation of the contact holes is added, which may increase the fabrication cost and the risk of an open failure of the data lines.

A product failure may be caused due to a stepped portion of the contact holes during the formation of the pixel electrodes, and a picture quality may be reduced due to a point defect. Also, if the passivation layer is not uniformly formed, storage capacitance may be decreased, which may cause a spot failure on a screen.

SUMMARY OF THE INVENTION

Accordingly, the present invention is directed to an array substrate for an LCD and fabrication method thereof that substantially obviates one or more of the aforementioned problems due to limitations and disadvantages of the related art. In general, the present invention achieves this by providing a structure and fabrication process that dispenses with a passivation layer.

An advantage of the present invention is that it reduces the number of steps required in fabricating any LCD.

Another advantage of the present invention is that it enhances the reliability of an LCD fabrication process.

Another advantage of the present invention is that it requires fewer pieces of equipment to manufacture an LCD.

Additional advantages of the invention will be set forth in the description which follows, and in part will be apparent from the description, or may be learned by practice of the invention. The advantages of the invention will be realized and attained by the structure particularly pointed out in the written description and claims hereof as well as the appended drawings.

The aforementioned and other advantages of the present invention are achieved with a method of fabricating an array substrate of an LCD, wherein the method comprises forming a gate line and a gate electrode connected to the gate line; forming a gate pad disposed at an end of the gate line, the gate pad having a gate insulating layer, wherein the gate insulating layer has a contact hole; forming a data line having a data pad; forming a thin film transistor having a source electrode, an active layer, and a drain electrode; forming a channel insulating layer on an exposed portion of the active layer; forming a transparent electrode pattern that contacts the gate pad through the contact hole; and forming a pixel electrode contacting the drain electrode.

In another aspect of the present invention, the aforementioned and other advantages are achieved by a array substrate of an LCD comprising a substrate; a plurality of gate lines and a plurality of data lines crossing the plurality of gate lines, defining a plurality of pixel regions; a plurality of thin film transistors, each of the thin film transistors including a gate electrode, an active layer, a source electrode, and a drain electrode; a channel insulating layer formed on the active layer of each of the plurality of thin film transistors between the source electrode and the drain electrode; a pixel electrode formed on each of the pixel regions and contacting the drain electrode; a gate pad formed at one end of each of the plurality of gate lines, the gate pad having a gate insulating layer, a contact hole disposed in the gate insulating layer; and a transparent electrode pattern contacting the gate pad through the contact hole.

In another aspect of the present invention, the aforementioned and other advantages are achieved by a method of fabricating an array substrate of an LCD, wherein the method comprises forming a gate line, a gate pad, and a gate electrode having three material sublayers; forming a data line having a data pad; forming a thin film transistor having a source electrode, an active layer, and a drain electrode; forming a channel insulating layer on an exposed portion of the active layer; forming a transparent electrode pattern that contacts the gate pad through the contact hole; and forming a pixel electrode contacting the drain electrode.

In another aspect of the present invention, the aforementioned and other advantages are achieved by an array substrate of an LCD, which comprises a substrate; a plurality of gate lines and a plurality of data lines crossing the plurality of gate lines, defining a plurality of pixel regions, wherein each of the plurality of data lines has three material sublayers; a plurality of thin film transistors, each of the thin film transistors including a gate electrode, an active layer, a source electrode, and a drain electrode; a channel insulating layer formed on the active layer of each of the plurality of thin film transistors between the source electrode and the drain electrode; a pixel electrode formed on each of the pixel regions and contacting the drain electrode; a gate pad formed at one end of each of the plurality of gate lines, the gate pad having three material sublayers; and a transparent electrode pattern contacting the gate pad through the contact hole.

It is to be understood that both the foregoing general description and the following detailed description are exemplary and explanatory and are intended to provide further explanation of the invention as claimed

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

DETAILED DESCRIPTION OF THE INVENTION

Reference will now be made in detail to the preferred embodiments of the present invention, examples of which are illustrated in the accompanying drawings.

Figure 1:
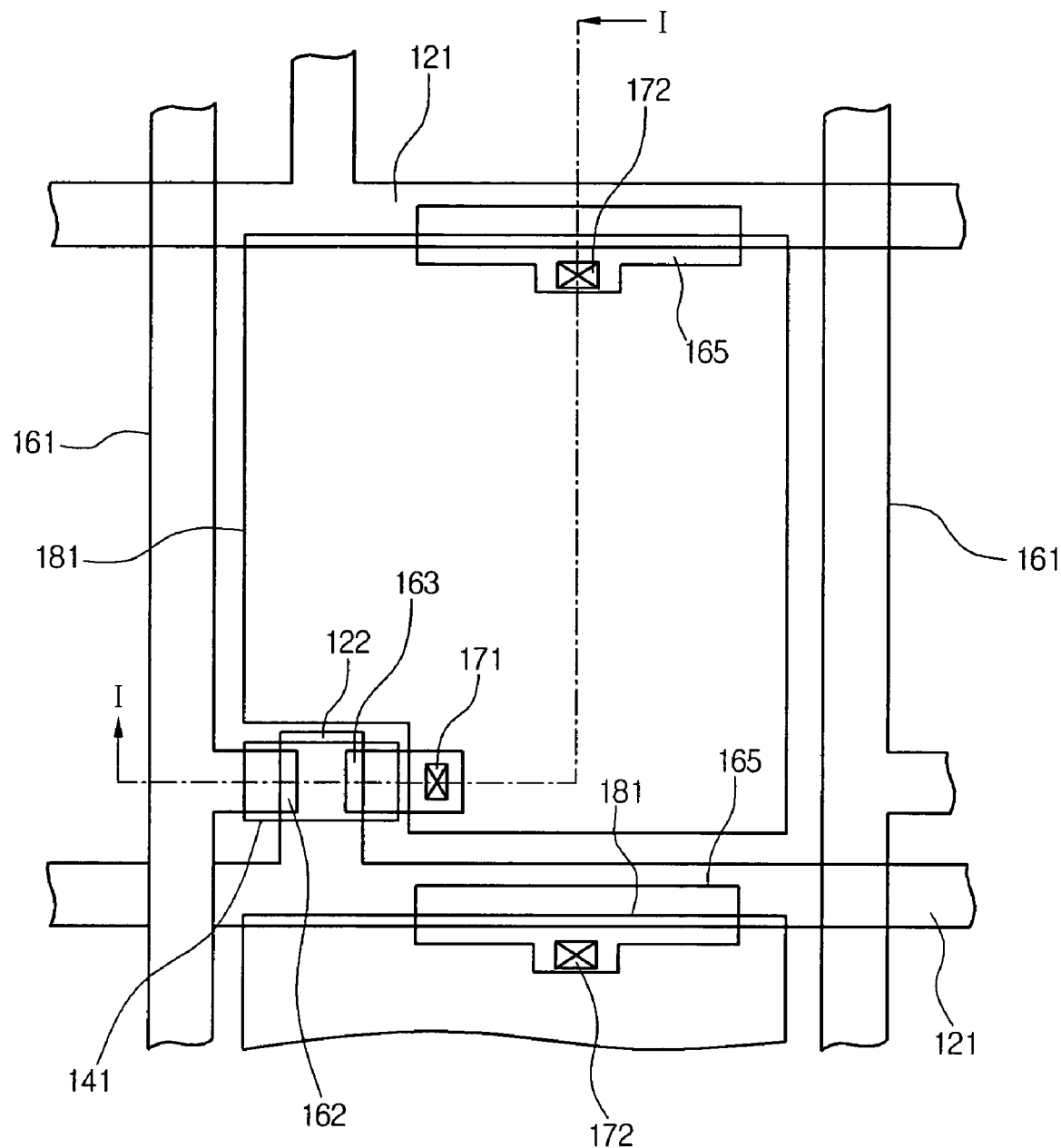
FIG. 1 is a plan view of an array substrate for an LCD according to the related art.
Figure 2:
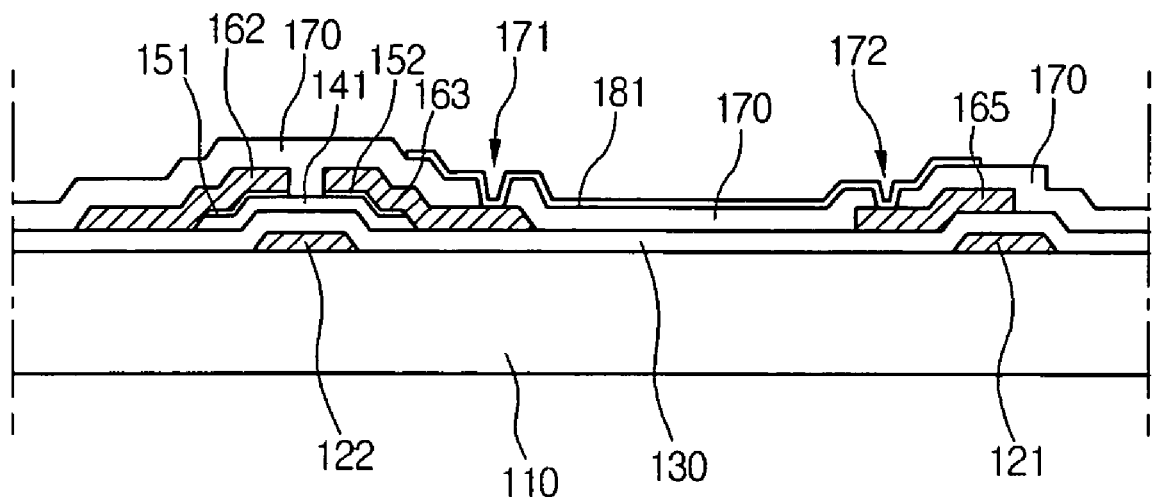
FIG. 2 is a sectional view taken along the line I-I' of FIG. 1.
Figure 3:
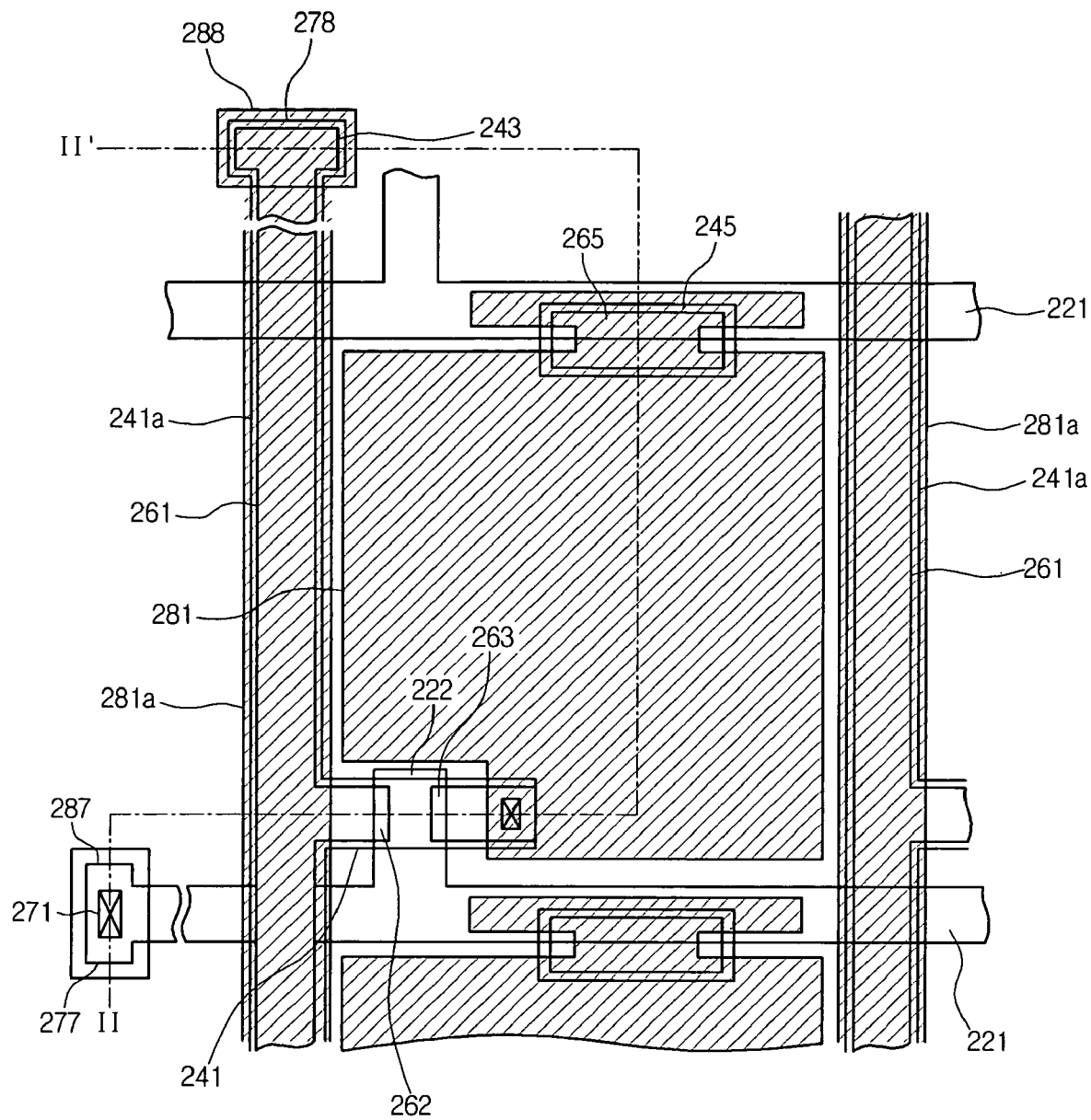
FIG. 3 is a plan view of an array substrate for an LCD according to an embodiment of the present invention.
Figure 4:
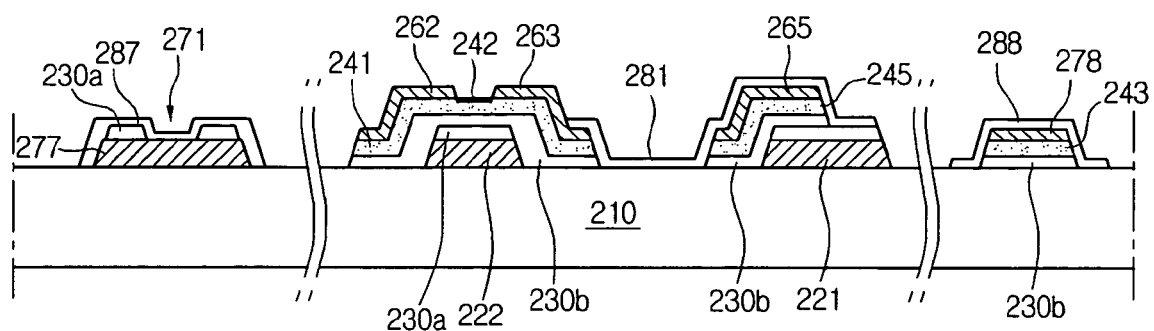
FIG. 4 is a sectional view taken along the line II-II' of FIG. 3.

FIG. 3 is a plan view of an array substrate for an LCD according to an embodiment of the present invention, and FIG. 4 is a sectional view taken along the line II-II' of FIG. 3. Referring to FIGS. 3 and 4, the array substrate for an LCD includes a transparent insulating substrate 210, a plurality of gate lines 221 formed on the transparent insulating substrate 210 in a horizontal direction, and a plurality of gate electrodes 222 protruding and extending from the plurality of gate lines 221. A gate pad 277 is formed at one extended end of each of the plurality of gate lines 221.

A first gate insulating layer 230a having a gate pad contact hole 271 is formed on the gate pad 277. A transparent electrode pattern 287 is formed on the first gate insulating layer 230a and is electrically connected with the gate pad through the gate pad contact hole 271.

The first insulating layer 230a and a second gate insulating layer 230b are formed on the plurality of gate lines 221 and the plurality of gate electrodes 222. An active layer 241 and an ohmic contact layer (not shown) are sequentially formed on the second insulating layer 230b.

As illustrated in FIG. 3, a plurality of data lines 261 perpendicularly cross the plurality of gate lines 221. A source electrode 262 extends from each of the date lines 261, and a drain electrode 263 is disposed near the source electrode 262, both of which partially overlap the gate electrode 222. A capacitor electrode 265 overlaps each of the plurality of gate lines 221.

A transparent conductive electrode material extending from a pixel electrode 281 is formed on the capacitor electrode 265. An active layer pattern 245 is formed below the data lines 261 and the capacitor electrode 265. In this configuration, a storage capacior is formed between the pixel electrode 281 and the gate lines 221. The gate insulating layer 230a formed between the pixel electrode 281 and the gate lines 221 may be thin to compensate for the storage capacitor, thereby preventing a spot failure. In other words, because the storage capacitor is formed evenly between the pixel electrode 281 extending from the capacitor electrode 265 and the gate lines 221, the storage capacitance is substantially compensated.

A channel insulating layer 242 having an insulating material such as silicon oxide (SiOx) is formed on the active layer, which forms a channel between the source electrode 262 and the drain electrode 263. The channel insulating layer 242 prevents the active layer 241 from being contaminated.

A pixel electrode pattern 281a is additionally formed on the data lines 261. The pixel electrode pattern 281a formed on the data lines 261 may be used as a self-repair pattern if an open circuit in the data line occurs. A pixel electrode 281 is formed at a pixel region defined by the crossing of the gate lines 221 and data lines 261. The pixel electrode 281 is electrically connected with the drain electrode 263 and the capacitor electrode 265. Also, the pixel electrode 281 covers the capacitor electrode 265 and is electrically connected with the capacitor electrode 265.

A data pad 278 is formed extending from each of the plurality of data lines 261 and at one end of each of the data lines 261. An active pattern 243 is formed below the data pad 278, and a transparent electrode pattern 288 is formed on the data pad 278. The active layer 241 and the data lines 261 are sequentially deposited and then patterned once. As such, the active layer pattern 241a is formed below the data lines 261.

A method of fabricating the array substrate having the above construction will now be described with reference to the accompanying drawings.

Figure 5A:
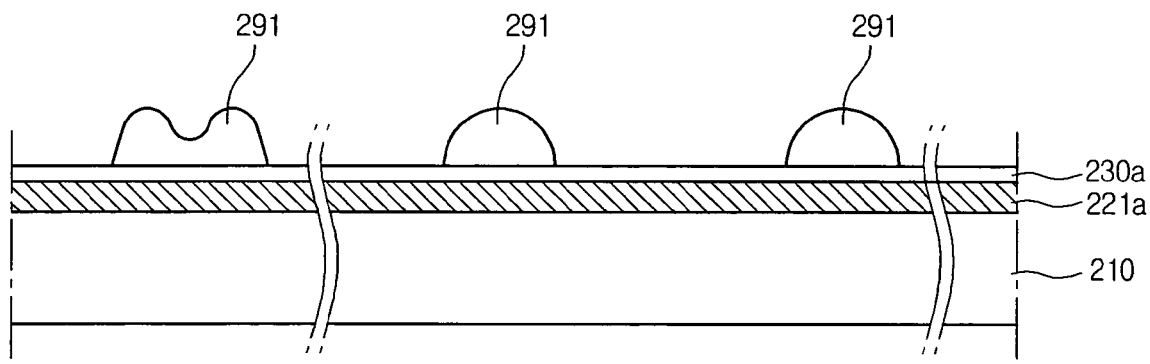
FIGS. 5A through 5G are sectional views illustrating a method of fabricating an array substrate for an LCD according to the present invention.

FIGS. 5A through 5G are sectional views illustrating a method of fabricating an array substrate for an LCD in a process flow according to the present invention. Referring to FIG. 5A, a gate line layer 221a for forming gate lines is deposited on a substrate 210, and then a first gate insulating layer 230a is deposited on the gate line layer 221a. The gate line layer 221a maybe formed of a metal, such as chromium (Cr), tungsten (W), aluminum (Al), molybdenum (Mo), titanium (Ti), tantalum (Ta), and aluminum (Al) alloy. The first gate insulating layer 230a may be formed of an insulating material such as silicon nitride (SiNx) and silicon dioxide (SiO2).

A photoresist film is coated on the first gate insulating layer 230a. The photoresist film may be a positive photoresist in which the portion exposed to light is developed by a developing solution. However, it will be readily apparent to one of ordinary skill that a negative photoresist may be used. The coated photoresist film is exposed to light through a diffraction mask disposed above the substrate 210 to form the photoresist pattern 291. The diffraction mask includes a first portion through which light is transmitted, a second portion configured as a grating and through which light is partially transmitted by diffraction, and a third portion by which light is completely blocked.

Using photolithography techniques, the photoresist film is exposed through the diffraction mask to form a photoresist pattern having a stepped portion. For example, light is projected onto the photoresist film on the substrate 210 through the mask, exposing portions of the photoresist film. Then, as the exposed photoresist film is developed, a photoresist pattern 291 is left on the gate pad 277, the gate lines 221 and the gate electrodes 222.

During the developing of the coated photoresist film, the exposed portion of the photoresist film is removed, so that the photoresist pattern 291 is formed as shown in FIG. 5A.

Figure 5B:
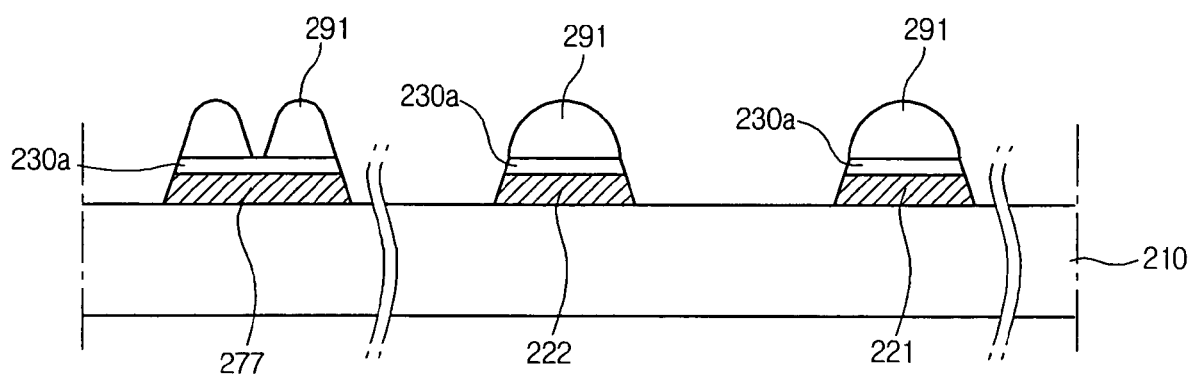
Figure 5C:
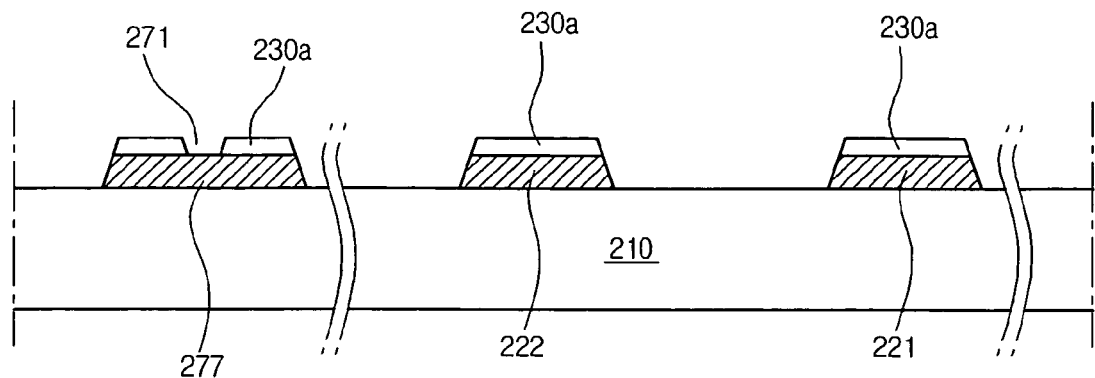

Next, referring to FIG. 5B, the first gate insulating layer 230a exposed by the photoresist pattern 291 is etched away by a dry etching, and then the underlying gate metal layer 221a is etched by a wet etching. Thereafter, an ashing process is performed about the photoresist pattern 291 remaining on the gate pad 277, the gate line 221 and the gate electrode 222. Due to the pattern on the diffraction mask, the photoresist pattern 291 disposed on the gate pad 277 has a shape, which includes a surface of varying heights. Accordingly, as the photoresist pattern 291 having a lower height on the gate pad 277 is removed, the first gate insulating layer 230a is partially exposed at the lower portions of the photoresist pattern 291. The exposed portion corresponds to the contact hole 271. The exposed portion of the first insulating layer 230a is etched by a dry etching process. Accordingly, as illustrated in FIG. 5C, the gate pad 277, the gate electrode 222 and the gate line 221 are formed on the substrate 210, and the first gate insulating layer 230a is formed on the gate pad 277, the gate electrode 222 and the gate line 221. Also, a gate pad contact hole 271 is formed in the first gate insulating layer 230a on the gate pad 277.

Then, the photoresist pattern 291 remaining on the gate pad 277 is stripped. The first gate insulating layer 230a having the gate pad contact hole 271 is formed on the gate pad 277 to protect the gate pad 277 from a contact failure due to corrosion and oxidation of the gate pad 277 during subsequent processing. In contrast, when the gate line 221 is formed of a metal material such as titanium (Ti), the first gate insulating layer 230a need not be formed on the gate pad 277.

Figure 5D:
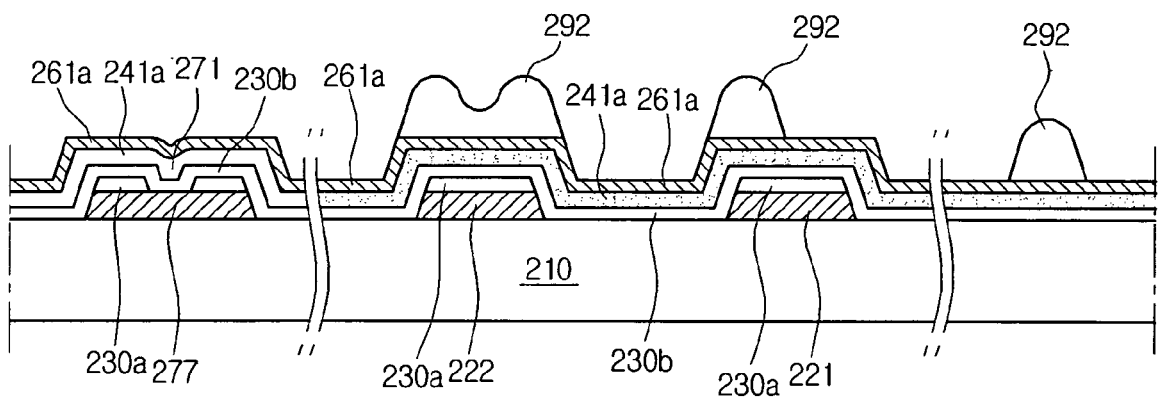

Next, referring to FIG. 5D, a second gate insulating layer 230b, a semiconductor layer 241a and a data line layer 261a for forming the data line are sequentially formed on an entire surface of the substrate 210 including the gate line 221, the gate electrode 222 and the gate pad 277.

The second gate insulating layer 230b may include an insulator, such as silicon nitride (SiNx) and silicon dioxide (SiO2). The data line layer 261a may be formed of a metal such as chromium (Cr), tungsten (W), aluminum (Al), molybdenum (Mo), titanium (Ti), tantalum (Ta),and aluminum (Al) alloy.

Next, a photoresist film is coated on the data line layer 261. The coated photoresist film is exposed using a diffraction mask disposed above the substrate 210 and then developed to form photoresist pattern 292.

Diffraction exposure using another diffraction mask is performed according to substantially the same principle as that in the previous exposing operation. By diffraction-exposing and developing the photoresist film, a photoresist pattern 292 having a predetermined step height is formed on the data line layer 261a.

For example, the photoresist pattern 292 is formed with a first portion covering an entire surface of the gate electrode 222, a second portion partially covering the gate line 221, and a third portion covering a predetermined portion of the gate line 221 and overlapping a region on where the data pad 278 is being formed.

Thereafter, the second gate insulating layer 230b, the semiconductor layer 241a and the data line layer 261a, which do not have the photoresist pattern 292 disposed on them, are etched and patterned using the photoresist pattern 292 as a mask.

Figure 5E:
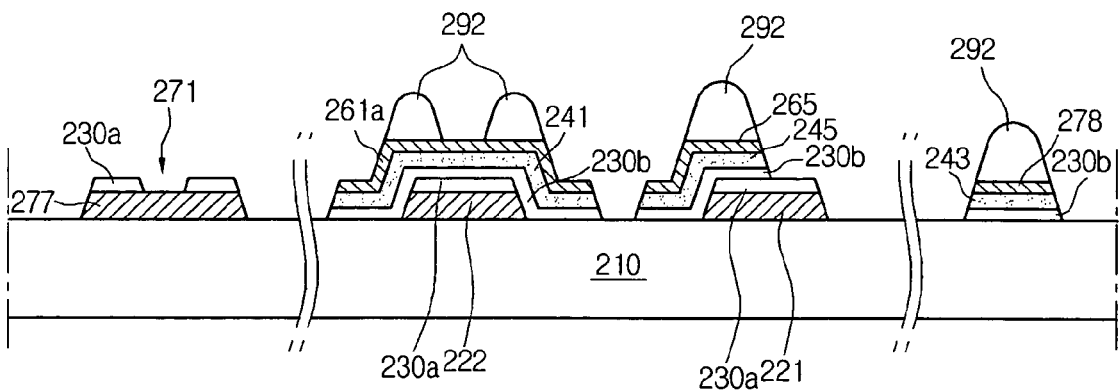

Referring to FIG. 5E, the data line layer 261a is wet-etched, and the semiconductor layer 241a and the second gate insulating layer 230b are dry-etched, so that only the first gate insulating layer 230a having the gate pad contact hole 271 is left on the gate pad 277. Also, the second gate insulating layer 230b, the active layer 241 and the second metal layer 261 are formed on the gate electrode 222. The photoresist pattern 292 partially remains on the patterned second metal layer 261, i.e., the data line pattern, above the gate electrode 222, and partly on the capacitor electrode 265 over the gate line 221.

On the gate line 221, the second gate insulating layer 230b partially overlaps the gate electrode 222. The first gate insulating layer 230a is formed on a surface of the gate electrode. An active layer 245 and a capacitor electrode 265 are formed on the gate line 221.

At one end of the gate line, a data pad 278 is formed. In doing so, the second gate insulating layer 230b, the active layer pattern 243, and the data pad 278 are sequentially formed on the data pad region of the substrate 210. At this stage of fabrication, the photoresist pattern 292 remains on the data pad 278.

Next, the photoresist pattern 292 formed over the gate electrode 222, over a portion of the gate line 221, and over a portion of the data pad 278 is partially stripped by an ashing process. The result of the partial stripping is such that an upper surface of the data line layer 261a is partially exposed. Then, the exposed portion of the data line layer 261a is etched to partially expose the active layer 241. By exposing the active layer 241, the data line layer 261a is divided into a source electrode 262 and drain electrode 263.

Figure 5F:
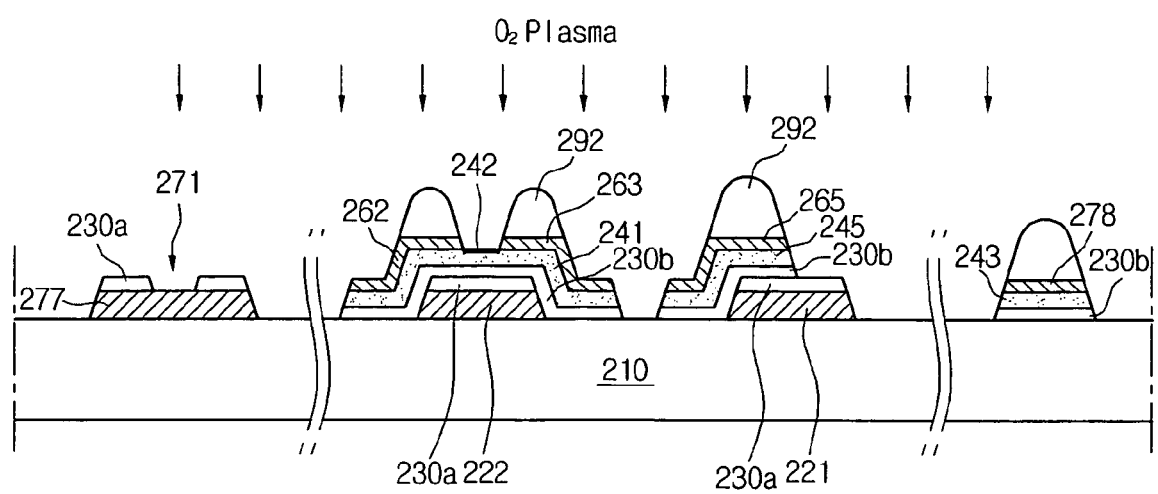

Referring to FIG. 5F, a source electrode 262 and a drain electrode 263 are spaced apart from each other by a predetermined distance by etching the exposed portion of the data line layer 261a. At this stage of the exemplary fabrication process, the photoresist pattern 292 still remains on a portion of the source electrode 262 and the drain electrode 263.

Next, in order to form a channel in the active layer 241, an impurity-doped layer formed on the active layer 241 is dry-etched using n+ ions, so that an ohmic contact layer (not shown) is formed below the source electrode 242 and the drain electrode 243. During the dry etching using n+ ions, the entire surface of the substrate 210 is exposed to $O_2$ plasma such that oxide ions are accelerated toward the exposed surface of the active layer 241 to form a channel insulating layer 242, which may include an oxide.

The exposing of the substrate to $O_2$ plasma can be easily performed using an n+ dry etching apparatus. It will be apparent to one of ordinary skill that other plasmas, such as nitrogen plasma, tungsten plasma, etc. may be used. The channel insulating layer 242 prevents the active layer 241 from being contaminated and protects the active layer.

Next, the photoresist pattern 292 remaining on the source electrode 262 and the drain electrode 263 is stripped.

Figure 5G:
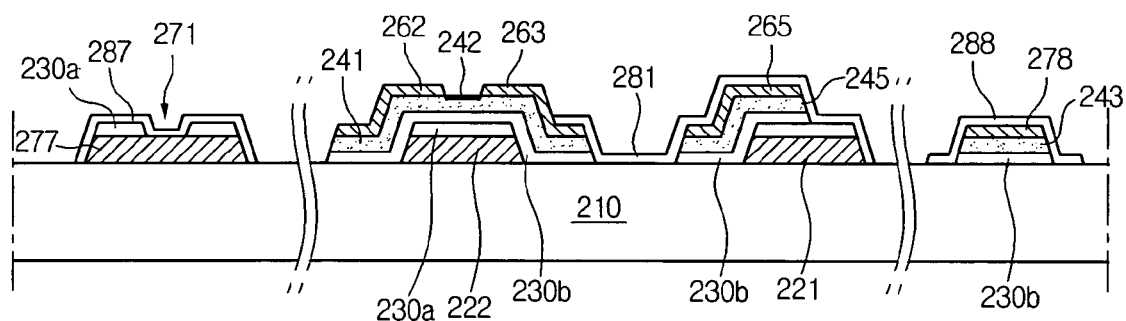

Referring to FIG. 5G, a transparent conductive electrode material is deposited and patterned to form a pixel electrode 281 and transparent electrode patterns 287 and 288. The transparent conductive electrode material transparent metals, such as indium tin oxide (ITO), indium zinc oxide (IZO), indium tin zinc oxide (ITZO), and the like.

The pixel electrode 281 is formed on the pixel region defined by the crossing of the gate lines 221 and the data lines 261, and is electrically connected with the drain electrode 263. The pixel electrode 281 extends to an upper surface of the gate line adjacent thereto to cover the capacitor electrode 265.

According to a particular embodiment of the present invention, a contact failure between the drain electrode 263 and the pixel electrode 281 can be prevented because the drain electrode 263 and the pixel electrode 281 are connected by a direct contact. In contrast, a contact failure may occur in a related art LCD that connects the pixel electrode with the drain electrode through a contact hole formed in the passivation layer.

The transparent electrode patterns 287 and 288 may be formed on the data line 261, and may be useful since they can be used as a self-repair electrode if an open failure of the data line occurs. The transparent electrode patterns 287 and 288 are also formed on the gate pad 277 and the data pad 278. The transparent electrode patterns 287 and 288 as formed on the gate pad 277 electrically contact the gate pad 277 through the gate pad contact hole 271.

Figure 6A:
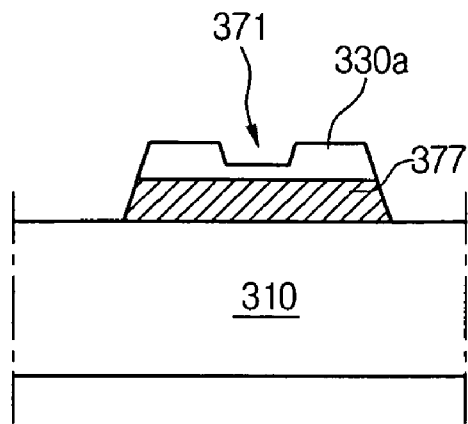
FIGS. 6A through 6C partially illustrate a process of forming a gate pad in an array substrate for an LCD according to the present invention.
Figure 6B:
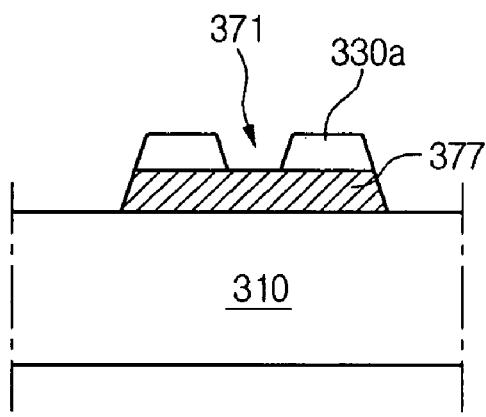
Figure 6C:
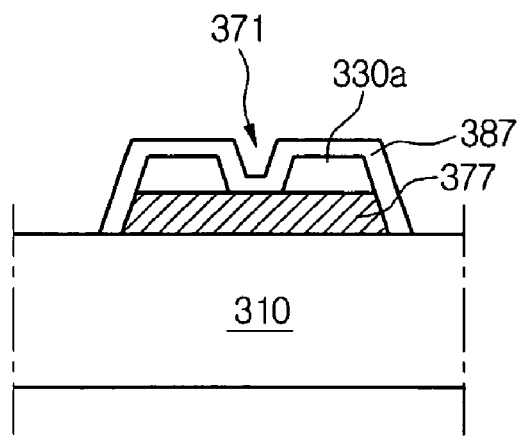

FIGS. 6A through 6C partially illustrate a process of forming a gate pad in an array substrate for an LCD according to the present invention.

Referring to FIGS. 6A and 5C, a gate pad 277, 377 is formed on each substrate 210, 310. First gate insulating layers 230a and 330a respectively formed on gate pads 277 and 377 have pad contact holes 271 and 371. The gate insulating layer 330a does not expose the gate pad 377 at contact hole 371. In forming these structures, a gate metal layer for forming gate lines is deposited on a substrate 210, 310 and then a first gate insulating layer 230a, 330a is deposited on the gate metal layer.

A photoresist film is coated on the first gate insulating layer 230a, 330a. The coated photoresist film is exposed to light through a diffraction mask disposed above the substrate 210, 310 and then developed to form a photoresist pattern having a surface with varying heights.

Next, the first gate insulating layer 230a, 330a that is exposed by the photoresist pattern is etched away by a dry etching, and the photoresist pattern formed on the gate pad 277, 377 having a lower height and the photoresist pattern remaining on the gate line 221 and the gate electrode 222, 322 are removed by an ashing process. As the photoresist pattern formed at a low height on the gate pad 277 is removed by the ashing, the first gate insulating layer 230a, 330a is partially exposed. The exposed portion of the first insulating layer 230a, 330a is etched by a dry etching process. By doing so, as shown in FIG. 6A, the first gate insulating layer 330a having a gate pad contact hole 371 that does not expose the gate pad 377 is formed on the gate pad 377.

Next, the gate metal layer is wet-etched to form the gate pad 377, gate lines and gate electrodes. Then, the photoresist pattern remaining on the gate pad 377 is stripped.

If the gate pad 377 is formed as above, the dry etching operation of the first gate insulating layer 330a, the ashing operation, and the dry etching operation for forming the gate pad contact hole 371 in the first gate insulating layer 330a can be performed with a single piece of equipment. Then, the resultant substrate is transferred to a wet etcher for wet-etching the gate metal layer. This results in easier and simpler fabrication.

Also, since the gate pad 377 can be protected by the first gate insulating layer 330a remaining in the gate pad contact hole 371, a contact failure between the gate pad 377 and the transparent electrode pattern 387 can be prevented.

Next, referring to FIGS. 6B and 5E, the layer of material used for the data line and the gate insulating layer 230a, 330a are etched using the photoresist pattern as a mask so as to form source electrode 262 and drain electrode 263 on a thin film transistor region. In doing so, the portions of the gate insulating layer 230a, 330a, which covers contact holes 271, 371, are removed, thereby exposing the contact holes 271, 371.

Referring to FIG. 6C and 5G, the gate pad 277, 377 electrically contacts the transparent electrode pattern 287, 387 through the gate pad contact hole 271, 371.

In an array substrate of an LCD according to the present invention, the gate line may be formed in a double-layer structure or a triple-layer structure.

To prevent a signal delay, Al, Al alloy, Mo, Cu, or the like having a relatively low resistivity (e.g., less than 15 μΩcm−1) is suitable for the metal material for the gate line. Among the above metal materials, Al and AlNd is most widely used.

However, Al or AlNd are susceptible to contamination, such as oxidation. When Al or AlNd is exposed to air, outward diffusion of Al ions and inward diffusion of oxygen ions occur, so that an oxide film, for example, $Al_2O_3$ film, is formed on a surface thereof. Also, when the gate line of Al or AlNd contacts the transparent pixel electrode having ITO, a contact portion between the two metal layers is oxidized due to the inner oxygen of the ITO, which results in an increase in electrical resistance.

Accordingly, a gate line formed of only Al is susceptible to device degradation due to oxidation. This effect can be mitigated by having the gate line be made in a stack structure having a Mo layer stacked on an Al layer. Mo has a relatively low resistivity of 12-14 μΩcm−1 and a relatively good contact characteristic with Al. Further, Mo can be used as the gate line material alone without a combination with other materials.

Figure 7:
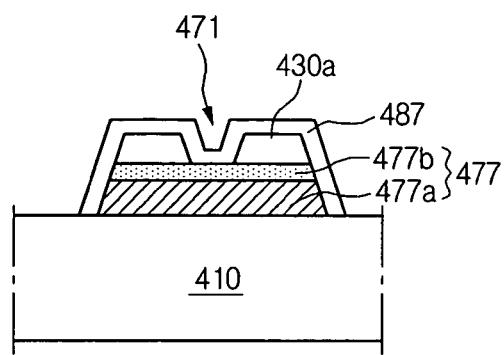
FIG. 7 is a sectional view of a gate pad of an array substrate for an LCD according to another embodiment of the present invention.

FIG. 7 is a sectional view of a gate pad of an array substrate for an LCD according to another embodiment of the present invention. As illustrated in FIG. 7, the gate pad 477 of the array substrate is formed at one end of the gate line having a double-layer structure. Like the gate line, the gate pad may have a double-layer structure.

The gate pad 477 is made having a double-layer structure consisting of a low resistance metal layer 477a and a barrier metal layer 477b. Mo may be used for the barrier metal layer 477b, and Al or Al alloy (ex. AlNd or the like) may be used for the low resistance metal layer 477a.

The gate insulating layer 430a is made of insulating material, such as silicon nitride (SiNx) or silicon oxide (SiOx). The gate insulating layer 430a formed on the gate pad 477 has a contact hole 471.

A transparent electrode pattern 487 is formed on the gate insulating layer 430a and contacts the gate pad 477 through the gate pad contact hole 471.

With the gate line and/or the gate pad 477 formed in a double-layer structure as described, an oxide layer can be prevented from being formed on the gate pad exposed through the gate pad contact hole when the gate pad is exposed to $O_2$ plasma, which is done to form a channel insulating layer on the active layer. Further, when the transparent electrode pattern 487 is formed on the gate pad 477, the contact between the two materials is enhanced, resulting in an improvement in device performance.

Figure 8:
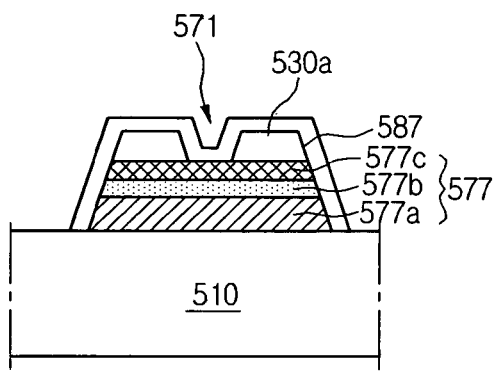
FIG. 8 is a sectional view of a gate pad of an array substrate for an LCD according to another embodiment of the present invention.

FIG. 8 is a sectional view of a gate pad of an array substrate for an LCD according to another embodiment of the present invention. As illustrated in FIG. 8, the gate pad 577 of the array substrate is formed at one end of the gate line having a triple-layer structure. Like the gate line, the gate pad has the triple-layer structure since the gate pad is formed from the same material as that of the gate line.

For example, the gate pad 577 may be made having a triple-layer structure consisting of a low resistance metal layer 577a, a first barrier metal layer 577b and a second barrier metal layer 577c. In one example, Mo is used for the first barrier metal layer 577b, and a transparent conductive material, such as ITO, IZO, and ITZO, is used for the second barrier metal layer 577c. Al, or an Al alloy (e.g., AlNd), may be used for the low resistance metal layer 577a.

The gate insulating layer 530a is made of insulating material, such as silicon nitride (SiNx) or silicon oxide (SiOx). The gate insulating layer 530a formed on the gate pad 577 has a gate pad contact hole 571.

A transparent electrode pattern 587 is formed on the gate insulating layer 530a contacting the gate pad 577 through the gate pad contact hole 571.

Accordingly, if the gate line and/or the gate pad are formed in a triple-layer structure, an oxide layer can be prevented from being formed on the gate pad due to the second barrier layer 577c exposed through the gate pad contact hole 571 while the gate pad is exposed to $O_2$ plasma, which is done to form a channel insulating layer on the active layer. In addition, the second barrier layer 577c prevents the gate line and the gate pad from being corroded and thus prevents a device failure resulting from corrosion. Alternatively, the $O_2$ plasma used for the channel insulating layer may be replaced by nitrogen plasma, tungsten plasma, or the like.

FIGS. 9A through 9G are sectional views illustrating a method of fabricating an array substrate for an LCD according to the present invention.

Figure 9A:
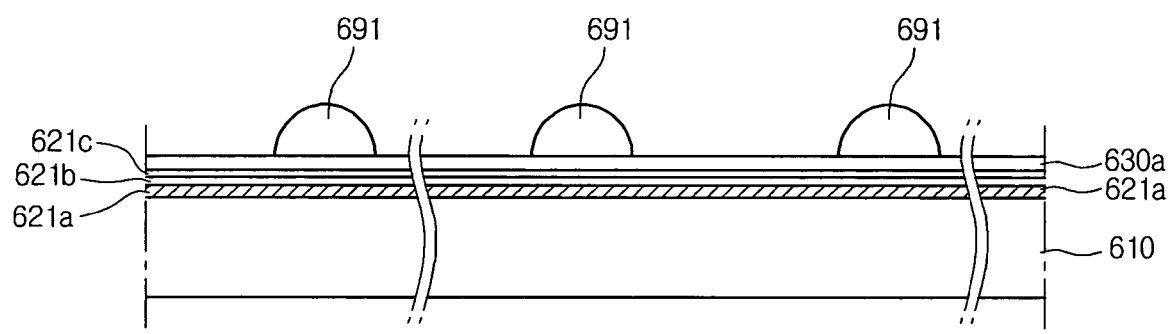
FIGS. 9A through 9G are sectional views illustrating a method of fabricating an array substrate for an LCD according to the present invention.

Referring to FIG. 9A, gate metal layers 621a, 621b, and 621c for the formation of gate lines are sequentially deposited on a substrate 610, and then a first gate insulating layer 630a is deposited on the gate metal layers 621a, 621b, and 621c.

The gate metal layers 621a, 621b and 621c are formed in a triple-layer structure in which the low resistance metal layer 621a, the first barrier metal layer 621b and the second barrier metal layer 621c are sequentially formed.

The gate metal layers 621a, 621b, and 621c include conductive material, such as chromium (Cr), tungsten (W), aluminum (Al), molybdenum (Mo), titanium (Ti), tantalum (Ta), and aluminum (Al) alloy. The first barrier metal layer 621b may be formed of Mo. The second barrier metal layer 621c may be formed of a transparent conductive material, such as ITO, IZO, and ITZO. The first gate insulating layer 630a is formed of an insulating material, such as silicon nitride (SiNx) and silicon dioxide ($SiO_2$).

A photoresist film is coated on the first gate insulating layer 630a. The coated photoresist film is exposed to light, except for regions where gate lines and gate electrodes are to be formed, through a diffraction mask disposed above the substrate 610 and having a predetermined pattern. As the exposed photoresist film is developed, a photoresist pattern 691 is formed on the regions where gate pad 677, gate lines 621 and gate electrodes 622 are to be formed, as illustrated in FIG. 9A.

Figure 9B:
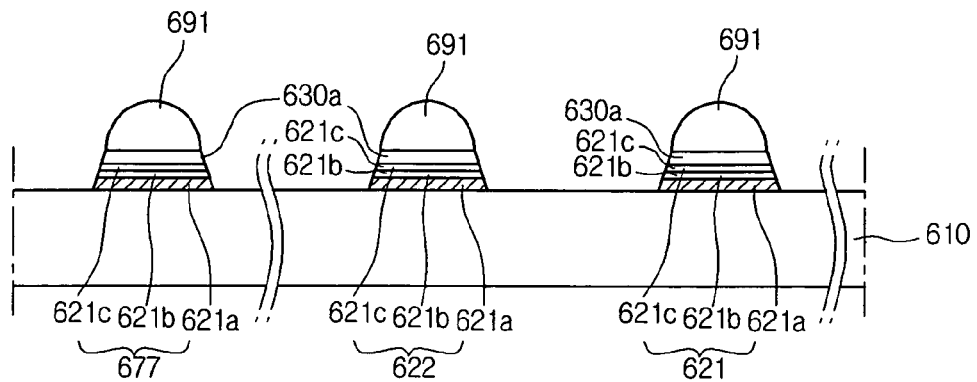

Next, referring to FIG. 9B, the first gate insulating layer 630a exposed by the photoresist pattern 691 is etched away by a dry etching process, and then the underlying gate metal layers 621a, 621b and 621c are etched by a wet etching process, so that the gate pad 677, the gate electrode 622 and the gate line 621 are formed.

Figure 9C:
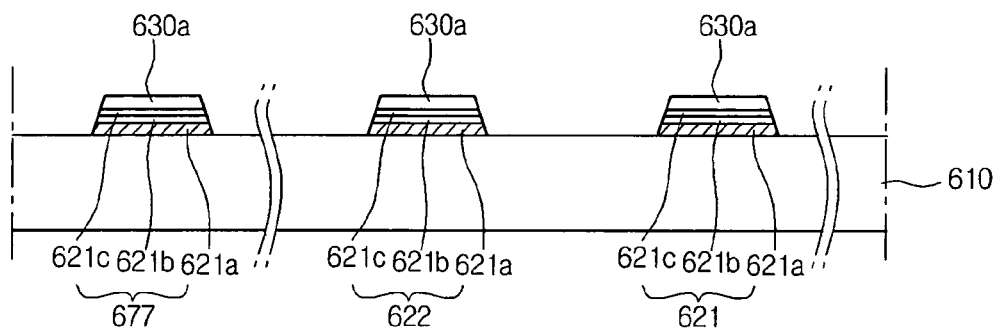

Thereafter, the photoresist pattern 691 remaining on the gate pad 677, the gate electrode 622 and the gate line 621 is stripped, as illustrated in FIG. 9C.

Figure 9D:
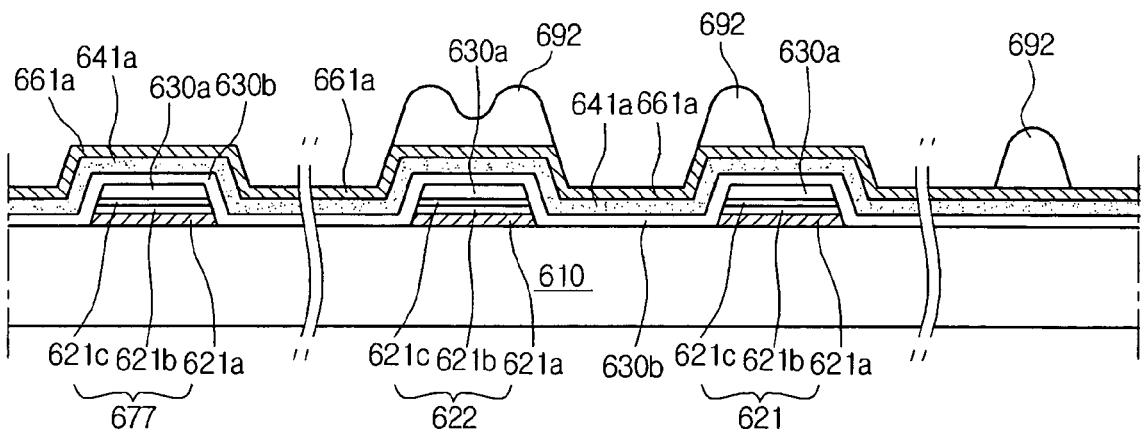

Next, referring to FIG. 9D, a second gate insulating layer 630b, a semiconductor layer 641a and a data line layer 661a for the formation of data lines are sequentially formed on an entire surface of the substrate 610 including the gate line 621, the gate electrode 622 and the gate pad 677.

The second gate insulating layer 630b is made of an insulating material, such as silicon nitride (SiNx) and silicon dioxide (SiO2). The data line layer 661a is formed of one a metal, such as chromium (Cr), tungsten (W), aluminum (Al), molybdenum (Mo), titanium (Ti), tantalum (Ta), and aluminum (Al) alloy.

Next, a photoresist film is coated on the data line layer 661a. The coated photoresist film is exposed to light using a diffraction mask disposed above the substrate 610 and having a predetermined pattern. The exposed photoresist film is then developed.

The diffraction exposure is performed according to substantially similar principles as those in the previous exposure operation. By diffraction-exposing and developing the photoresist film, a photoresist pattern 692 is formed on the data line layer 661a. The photoresist pattern 692 formed above the gate electrode 622 has a stepped portion (i.e., a surface with varying height). The photoresist pattern 692 partially formed above the gate line 621 and the data pad 678 partially overlaps the gate line 621.

Thereafter, the second gate insulating layer 630b, the semiconductor layer 641a and the data line layer 661a, which do not have the photoresist pattern 692 on them, are etched and patterned using the photoresist pattern 692 as a mask.

Figure 9E:
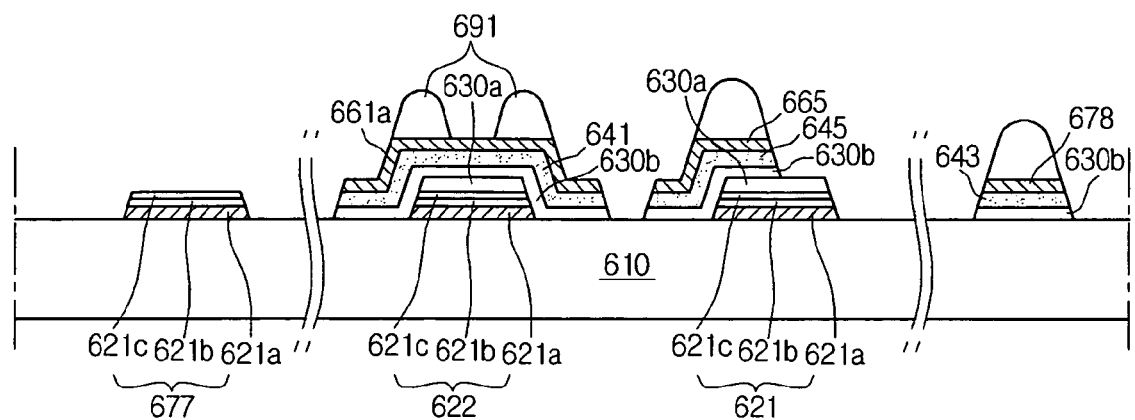

As illustrated in FIG. 9E, the first gate insulating layer 630a formed on the gate pad 677 is removed along with the second gate insulating layer 630b in an etching process. Alternatively, the gate pad 677 may be opened by removing the first gate insulating layer 630a formed on the gate pad 677 using a diffraction exposure when the gate line 621 and the gate electrode 622 are formed.

Figure 9F:
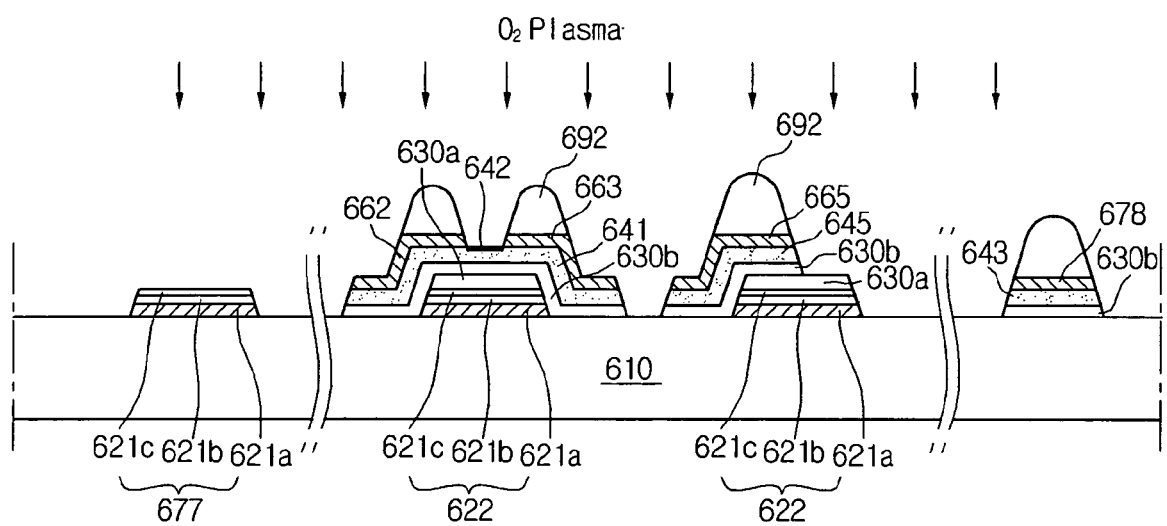

Referring to FIGS. 9E and 9F, the photoresist pattern 692 formed above the gate electrode 622 and having the stepped portion, and the photoresist pattern 692 partially remaining above the gate line and remaining on the data pad 678, are ashed such that an upper surface of the data line layer 661a is partially exposed. Then, the exposed data line layer 661a is etched such that an upper surface of an active layer 641 is exposed.

By doing so, a source electrode 662 and a drain electrode 663 are formed on the active layer 641 and spaced apart from the source electrode 662 at a predetermined distance. The photoresist pattern 692 remains on the source electrode 662 and the drain electrode 663.

Next, in order to form a channel in the active layer 641, an impurity-doped layer (not shown) is formed on the active layer 241 by dry-etching using n+ ions. By dry-etching, an ohmic contact layer (not shown) is formed below the source electrode 642 and the drain electrode 643.

During the dry etching using n+ ions, the entire surface of the substrate 610 is exposed to O₂ plasma such that oxide ions are accelerated toward the exposed surface of the amorphous active layer 641 to form a channel insulating layer 642 such as an oxide. The channel insulating layer 642 prevents the active layer 641 from being contaminated.

The exposing of the substrate to O₂ plasma can be performed using an n+ dry etching apparatus generally known to the art. Further, the O₂ plasma may be replaced by nitrogen plasma, tungsten plasma, or the like.

Thereafter, the photoresist pattern 692 remaining on the source electrode 662 and the drain electrode 663 is stripped.

Figure 9G:
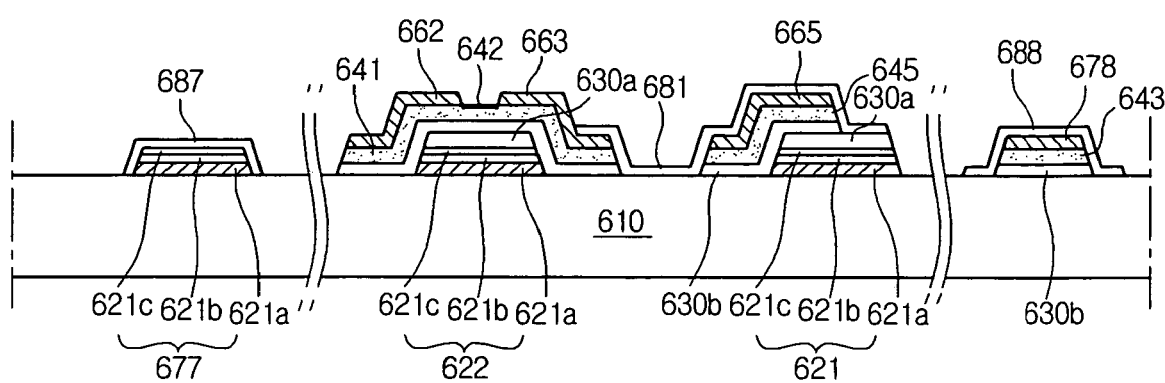

Referring to FIG. 9G, a transparent conductive electrode material is deposited and patterned to form a pixel electrode 681 and transparent conductive electrode patterns 687 and 688. The transparent conductive electrode material includes a transparent conductive material, such as indium tin oxide (ITO), indium zinc oxide (IZO), and indium tin zinc oxide (ITZO).

The pixel electrode 681 is formed on the pixel region defined by the crossed gate lines 621 and data lines 661 and is electrically connected with the drain electrode 663. The pixel electrode 681 extends to an upper surface of the gate line adjacent thereto to cover the capacitor electrode 665.

According to the present invention, because the drain electrode 663 and the pixel electrode 681 are connected by direct contact, a contact failure between the two electrodes due to an open failure of the pixel electrode 681 can be prevented. The transparent electrode patterns 687 and 688 are formed on the data line 661 and can be used as a self-repair electrode if an open failure of the data line occurs. The transparent electrode patterns 687 and 688 are also formed on the gate pad 677 and the data pad 678.

As described above, according to the present invention, since an array substrate of an LCD is designed to contact the drain electrode with the pixel electrode without a passivation layer interposed between them, the array substrate can be fabricated using only three masks. As such, fabrication is simplified and fabrication costs are reduced.

Also, since the pixel electrode patterns are formed even on the data line, they can be used as a self-repair electrode if an open failure of the data line occurs. Accordingly, a product failure is prevented and process time is shortened, thereby enhancing the production yield. In addition, since the channel layer of the thin film transistor is processed by plasma to form a channel insulating layer, the active layer 641 can be prevented from being contaminated, thereby enhancing signal characteristics. Further, since the plasma processing can be performed along with the dry etching corresponding to a previous process of the plasma processing is performed, a separate plasma apparatus is not needed. This simplifies the fabrication process and can reduce costs.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A method of fabricating an array substrate of an LCD, the method comprising:

forming a gate line, a gate electrode connected to the gate line, a gate pad disposed at an end of the gate line and a first gate insulating layer formed on each of the gate pad, the gate line and the gate electrode on a substrate, wherein the first gate insulating layer on the gate pad has a contact hole, wherein the gate line, the gate electrode, the gate pad and the first gate insulating layer are formed by using a first photoresist pattern;

forming a second gate insulating layer on the gate line and the gate electrode, a data line having a data pad, a thin film transistor having a source electrode, an active layer, and a drain electrode, wherein the second gate insulating layer, the data line and the thin film transistor are formed by using a second photoresist pattern;

forming a channel insulating layer on an exposed portion of the active layer by plasma process;

forming a transparent electrode pattern that contacts the gate pad through the contact hole and covers the data pad and the data line, wherein the data pad is covered completely by the transparent electrode pattern; and forming a pixel electrode in a pixel region and on some portions of the drain electrode, wherein the drain electrode and the pixel electrode are connected by direct contact.

2. The method of claim 1, wherein forming the gate line includes:
   forming a gate line layer, a first gate insulating layer, and a photoresist film on the substrate;
   exposing and developing the photoresist film with a diffraction mask such that the photoresist film has a stepped portion, wherein a lower portion of the stepped portion corresponds to the contact hole;
   etching the gate line layer and the first gate insulating layer to form the gate pad and the gate electrode;
   ashing the photoresist film such that the first gate insulating layer on the gate pad is exposed at the lower portion of the photoresist film;
   etching the exposed portion of the first gate insulating layer to form the contact hole on the gate pad; and
   stripping the photoresist film.

3. The method of claim 1, wherein forming the thin film transistor includes:
   wholly depositing the second gate insulating layer, a semiconductor layer, a data line layer and a photoresist film;
   exposing and developing the photoresist film such that the photoresist film has portions of a different height, wherein the portions includes a lower portion corresponding to the exposed portion of the active layer;
   etching the second gate insulating layer, the semiconductor layer, and the data line layer, wherein a portion of the data line layer corresponding to the lower portion is removed, exposing a portion of the semiconductor layer; and
   stripping the photoresist film.

4. The method of claim 3, wherein forming the channel insulating layer includes dry-etching the exposed portion of the active layer using n+ions.

5. The method of claim 3, wherein the forming the transparent electrode pattern includes forming a capacitor electrode between the gate line and the first and second gate insulating layer, and overlapping the gate line.

6. An array substrate of an LCD, comprising:
   a substrate;
   a plurality of gate lines and a plurality of data lines crossing the plurality of gate lines, defining a plurality of pixel regions;
   a first gate insulating layer on the gate lines, wherein a side surface of the first gate insulating layer is disposed at the same plane with a side surface of the gate lines;
   a second gate insulating layer under the data lines, wherein a side surface of the second gate insulating layer is disposed at the same plane with a side surface of the data lines;
   a plurality of thin film transistors, each of the thin film transistors including a gate electrode, an active layer, a source electrode, and a drain electrode;
   a channel insulating layer formed on the active layer of each of the plurality of thin film transistors between the source electrode and the drain electrode;
   a pixel electrode formed on each of the pixel regions and on some portions of the drain electrode, wherein the drain electrode and the pixel electrode are connected by direct contact;
   a gate pad formed at one end of each of the plurality of gate lines, a first gate insulating layer and a second gate insulating layer formed on each of the gate pad, the gate line and the gate electrode, wherein the first gate insulating layer on the gate pad has a contact hole and the second gate insulating is wholly formed on the substrate and the first gate insulating layer; and
   a transparent electrode pattern contacting the gate pad through the contact hole and covering a data pad and the data line, wherein the data pad is covered completely by the transparent electrode pattern.

7. The array substrate according to claim 6, wherein each of the plurality of gate lines, the gate electrode and the gate pad has a double-layer structure.

8. The array substrate according to claim 6, wherein each of the plurality of gate lines, the gate electrode and the gate pad has a triple-layer structure.

9. The array substrate according to claim 6, wherein the channel insulating layer includes silicon oxide (SiOx).

10. The array substrate according to claim 6, further comprising an active layer pattern and a capacitor electrode partially formed above the plurality of gate lines and partially overlapping the plurality of gate lines.

11. The array substrate according to claim 6, wherein the transparent electrode pattern is formed on the plurality of data lines.

12. The array substrate according to claim 6, wherein the gate insulating layer includes silicon nitride (SiNx).

13. A method of fabricating an array substrate of an LCD, the method comprising:
   forming a gate line, a gate pad, a gate electrode a gate pad disposed at an end of the gate line and a first gate insulating layer formed on each of the gate pad, the gate line and the gate electrode on a substrate, wherein the gate line, the gate pad and the gate electrode have three material sublayers, wherein the gate line, the gate electrode, the gate pad and the first gate insulating layer are formed by using a first photoresist pattern;
   forming a second gate insulating layer on the substrate and the first gate insulating layer;
   forming a data line having a data pad, a thin film transistor having a source electrode, an active layer, and a drain electrode, wherein the second gate insulating layer, the data line and the thin film transistor are formed by using a second photoresist pattern;
   forming a channel insulating layer on an exposed portion of the active layer by plasma process;
   forming a transparent electrode pattern that contacts the gate pad through the contact hole and covers the data pad and the data line, wherein the data pad is covered completely by the transparent electrode pattern; and
   forming a pixel electrode in a pixel region and on some portions of the drain electrode, wherein the drain electrode and the pixel electrode are connected by direct contact.

14. The method of claim 13, wherein forming the gate line, the gate pad; and the gate electrode having three material sublayers includes:
   forming a low resistance metal sublayer;
   forming a first barrier metal sublayer having Mo on the low resistance metal sublayer; and
   forming a second barrier metal sublayer having a transparent conductive material on the first barrier metal sublayer.

15. The method of claim 14, wherein forming the low resistance metal sublayer includes forming a layer having Al.

16. The method of claim 14, wherein forming the second barrier metal sublayer includes forming a layer having ITO.

17. An array substrate of an LCD, comprising:
   a substrate;

a plurality of gate lines and a plurality of data lines crossing the plurality of gate lines, defining a plurality of pixel regions, wherein each of the plurality of data lines has three material sublayers;

a first gate insulating layer on the gate lines, wherein a side surface of the first gate insulating layer is disposed at the same plane with a side surface of the gate lines;

a second gate insulating layer under the data lines, wherein a side surface of the first gate insulating layer is disposed at the same plane with a side surface of the data lines;

a plurality of thin film transistors, each of the thin film transistors including a gate electrode, an active layer, a source electrode, and a drain electrode;

a channel insulating layer formed on the active layer of each of the plurality of thin film transistors between the source electrode and the drain electrode;

a pixel electrode formed on each of the pixel regions and on some portions of the drain electrode, wherein the drain electrode and the pixel electrode are connected by direct contact;

a gate pad formed at one end of each of the plurality of gate lines, the gate pad having three material sublayers, wherein the three material sublayers includes: a low resistance metal sublayer; a first barrier metal sublayer having Mo on the low resistance metal sublayer; and a second barrier metal sublayer having a transparent conductive material on the first barrier metal sublayer; and a transparent electrode pattern contacting the gate pad through the contact hole and covering a data pad and the data line, wherein the data pad is covered completely by the transparent electrode pattern.

18. The array substrate according to claim 17, wherein the low resistance metal sublayer includes Al.

19. The array substrate according to claim 17, wherein the second barrier metal sublayer includes ITO.

20. The method of claim 1, forming a pixel electrode includes: forming a transparent electrode pattern on the plurality of data lines, wherein the transparent electrode pattern is identical with the material of a pixel electrode.

21. The method of claim 14, wherein forming a data line and a thin film transistor includes: removing the first gate insulating layer and the second gate insulating layer formed on each of the gate pad, the gate line and the gate electrode on the substrate, and the second gate insulating layer formed on the substrate.

22. A method of fabricating an array substrate of an LCD, the method comprising:

forming a gate line layer on a substrate;

forming a first gate insulating layer on the gate line layer;

forming a first photoresist pattern on the first gate insulating layer;

patterning the gate line layer and the first gate insulating layer by using the first photoresist pattern to form a gate line on the substrate;

forming a second gate insulating layer on the substrate;

forming a semiconductor layer on the second gate insulating layer;

forming a data line layer on the semiconductor layer;

forming a second photoresist pattern on the data line layer;

patterning the data line layer, the semiconductor layer and the second gate insulating layer by using the second photoresist pattern to form an active layer on the second gate insulating layer, a data line crossing the gate line, a source electrode connected with the data line, a drain electrode on the active layer; and forming a pixel electrode directly connected with the drain electrode.

\* \* \* \* \*